Dec. 29, 1964  H. L. HENDRIX  3,163,124
SPAN CAR
Filed Nov. 2, 1962
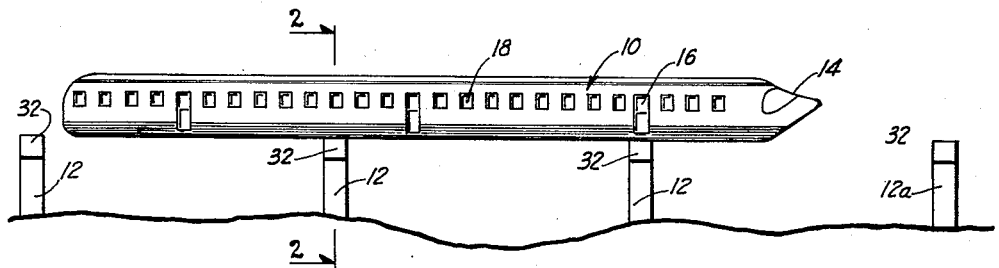
Fig. 1
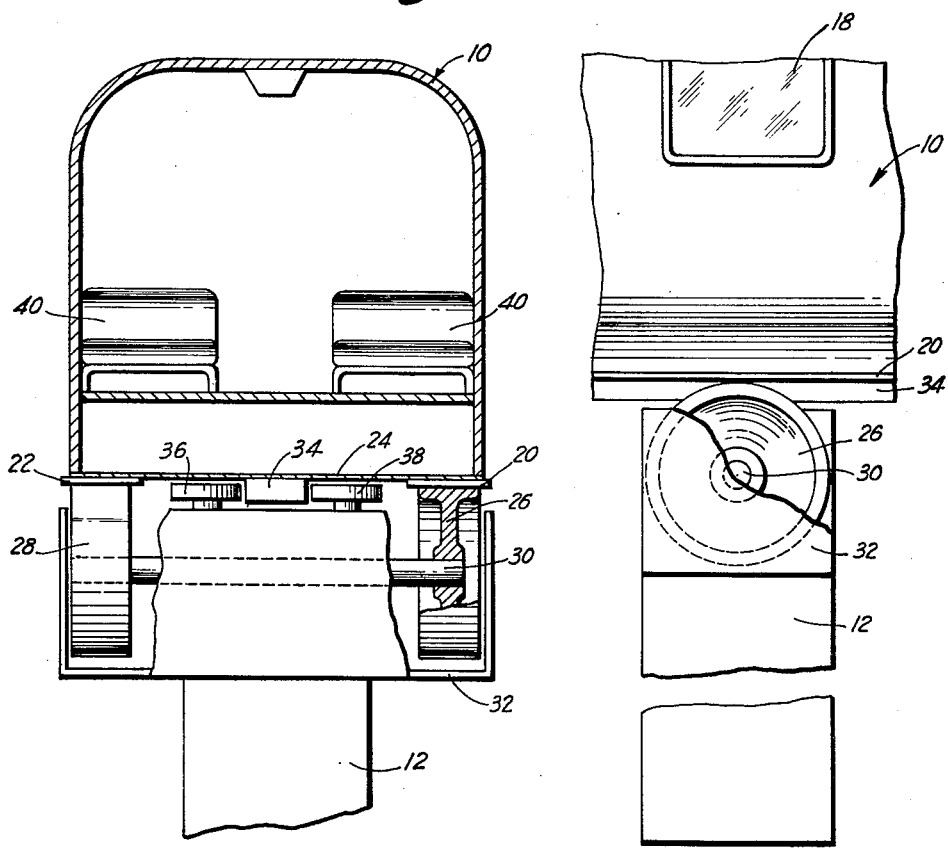
Fig. 2
Fig. 3
INVENTOR.
*Hubert Lee Hendrix*
BY
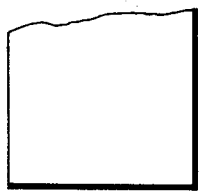
ATTORNEY 3,163,124
SPAN CAR
Hubert L. Hendrix, 1108 S. Rockford, Tulsa, Okla.
Substituted for abandoned application Ser. No. 139,586, Sept. 19, 1961. This application Nov. 2, 1962, Ser. No. 234,971
6 Claims. (Cl. 104—135)

This invention relates to improvements in transportation systems and more particularly, but not by way of limitation, to a rapid transit system adapted for traversing residential, commercial, industrial areas, urban centers, or the like, without disruption of existing facilities. This application is a substitute application for my previously abandoned application, Serial Number 139,586, filed September 19, 1961, and entitled "Span Car."

The need for improved public transportation systems is great throughout all sections of this country today. It is well known that commuter systems, public or private bus transportation systems and other existing transit systems are facing great problems today, both financially and otherwise. Surface systems are generally considered to be more economical and practical, but congested areas of urban centers create problems for any type of transit systems depending upon vehicles moving through the city streets or on the surface of the ground. As a result, elevated systems and underground methods of transportation have been developed and are in rather wide spread use. However, the expense involved in both installing and maintaining these systems in efficient operating conditions is extremely great and the overall financial problems being thrust upon these systems throughout the country is evidence of the great need for improved and more economical means and methods of transporting commuters, and the like.

The present invention contemplates a novel rapid transit system, particularly designed and constructed for traversing congested areas, and the like, without disruption of the existing facilities or other passenger and vehicle movement. The invention provides a novel span car which is provided with suitable runners adapted to glide over wheels, which are journalled on stationary spaced independent support piers or cradles. The spacing of the piers or frames will be determined by the distance required to clear streets or other obstacles, and the distance between the piers will establish the length required for the span car, since the length of the car must be sufficient to maintain stability while the car is moving from pier or cradle to cradle. The length of the car must be sufficient to assure support thereof by at least two piers at all times during movement or operation of the vehicle. Thus, as the car is cantilevered from one support member or pier toward the next succeeding or adjacent pier, the length of the car is sufficient to permit support thereof by at least two of the preceding piers until such time that the forward portion of the car is disposed on the said next succeeding pier. The vehicle or span car is preferably powered by jet motors, or the like, to provide both propulsion and braking thereof and of course, additional power may be supplied for acceleration and deceleration thereof, as may be required when approaching or leaving the passenger stations, to reduce the required size of the motors on the cars.

It is an important object of this invention to provide a novel transit system, particularly adapted and constructed for transportation of passengers, freight, or the like, in a manner precluding interference or disruption of other existing facilities.

It is another object of this invention to provide a novel transit system for traversing congested areas, or the like, which may be installed and operated with a minimum of expense.

A further object of this invention is to provide a novel vehicle, or transportation means which is adapted to be supported by independent spaced piers in a cantilever fashion.

Another object of this invention is to provide a span car, particularly designed for rapid movement along a plurality of spaced independent support members with great ease.

A still further object of this invention is to provide a novel span car adapted for movement along a plurality of spaced support structures with a minimum of girders, bridging structures, and the like.

Still another object of this invention is to provide a transit system wherein the need for support tracks is eliminated.

Still another object of this invention is to provide a novel span car and transit system which is simple and efficient in operation and economical and durable in construction.

Other and further objects and advantageous features of the present invention will hereinafter more fully appear in connection with a detailed description of the drawings in which:

FIGURE 1 is a side elevational view of a portion of a transit system depicting a vehicle and support members embodying the invention.

FIGURE 2 is an enlarged sectional view taken on line 2—2 of FIGURE 1, with portions depicted in elevation for purposes of illustration.

FIGURE 3 is a side elevational view of a support member and a portion of a vehicle thereon, with portions broken away for purposes of illustration.

Referring to the drawings in detail, reference character 10 generally indicates a vehicle or span car adapted to be supported by and move along a plurality of spaced support piers or foundations 12. The support piers 12 are independent structures and may be disposed in substantial alignment and spaced in accordance with the installation requirements for the transit system, as will be hereinafter set forth. The overall length of the span car 10 is preferably approximately two and one-half times the length of the longest span between any adjacent pair of foundations 12 for assuring that the car 10 will be supported by at least two of the support frames or piers 12 at all times during operation thereof. Thus, as the car 10 is moving along the support members 12, the forward portion 14 thereof will be in a cantilever position extending toward the next succeeding pier 12 in the sequence, but, the length of car 10 is such that the rear portion thereof, will not be removed from disposition on the last or rearmost pier in the series or sequence supporting the car until the forward portion thereof is resting upon the said next succeeding pier.

The car 10 may be suitably keyed in any well known manner (not shown) for shear, and suitably hinged (not shown) for moment transfer. This type of construction is well known in elongated vehicles of this type. The sharpened horizontal curves to be traversed by the car will be more efficiently maneuvered if the hinges (not shown) are located or disposed on the center line of the units or cars 10. In any event, however, the car 10 must be of a suitable construction to carry or support its own load between the foundations or piers 12, when in a cantilever position, wherein the forward or rear portion of the car is extending from a pier with no other support therefor.

It is further preferable that the front end 14 of the car 10 be cambered, as particularly shown in FIGURE 1, in order to preclude any possibility of a downward deflection of the forward end 14 below a pier, such as 12a in FIGURE 1, upon approach of the car 10 thereto. The car 10 may be constructed in the manner of a box girder, as is well known, and is preferably approximately ten feet square in transverse configuration, but not limited thereto. The sides of the box type construction will function as the web of the structure and the flanges of the top and bottom thereof will function as flanges and web for the sides. In addition to plate stiffness, the box girder construction will preferably be stiffened or strengthened at spaced intervals with partitions or partial partitions (not shown) which may function to separate the car into compartments. In addition, the openings provided for the doors 16 and windows 18 are preferably reinforced similar to the openings in the web of a plate girder. This type of construction is well known and conventional in structures of this type, and the car 10 may be a single unit or a group of units connected in end to end relationship in a manner to transfer shear and moment.

The span car 10 is provided with a pair of spaced runner members 20 and 22, secured to the bottom or lower portion 24 thereof and extending throughout the entire length of the car. The runners are preferably disposed in the proximity of the side edges of the bottom portion 24 and glide or move along spaced wheels 26 and 28 which are journalled on each pier 12 in any suitable manner (not shown). The wheels 26 and 28 are preferably carried by a shaft 30, which is suitably supported in the upper cradle or frame portion 32 of each support or pier 12 for maintaining the wheels 26 and 28 in substantial alignment. The cradle 32 may be of any suitable construction and is rigidly secured to the respective pier 12 in any well known manner (not shown). It is preferable that the runners 20 and 22 be of a traverse width substantially equal to twice the width of the respective wheels, but not limited thereto, in order to compensate for any variency of alignment between the wheels and the respective runners during operation of the span car 10. In addition, it is considered desirable to provide a layer of suitable flexible material (not shown) between the runners 20 and 22 and the lower portion 24 of the car. This is to provide a smooth and quiet operation of the span car and facilitate confirmation of the runners with any vertical curves or fluctuations encountered during travel as will be hereinafter set forth in detail.

A longitudinally extending guide channel 34 is secured to the lower portion 24 of the car 10 and is substantially centerly disposed between the runners 20 and 22. The guide channel 34 extends substantially throughout the length of the car 10 and as a practical matter may be approximately eighteen inches wide, but not limited thereto. It is preferable that the forward portion of the channel 34 (not shown) be tapered to a width of approximately two inches to facilitate the overall operation of the car 10 as the car moves along the independent spaced support pier 12. Each support pier 12 is provided with a pair of spaced guide wheels 36 and 38, which extend upwardly therefrom and are spaced apart a distance complementary to the width of the channel member 34, whereby the channel member may move therebetween during operation of the car 10. The guide wheels 36 and 38 are journalled to the upper portion 32 of each pier 12 in any suitable manner and any contact between the wheels and the guide channel 34 therebetween, during movement of the car 10 will cause the wheels to rotate for facilitating movement of the car and to guide the movement thereof from support frame to support frame.

Of course, the car 10 may be provided with suitable passenger seats 40, or the like, within the interior thereof, as desired, to accommodate commuters or other passengers using the transit system. As hereinbefore set forth, the car may be divided into sections by transversely extending partitions (not shown) and may be fitted or interiorly decorated in any suitable or pleasing manner.

In addition, it is anticipated that jet nozzles (not shown) may be provided in the cradle portion 32 of each pier 12 in lieu of the wheels 26 and 28. In this instance, the jet nozzles may be so arranged as to eject air, or the like, upwardly from the piers 12 for supporting the car 10 passing thereover. The jet nozzles may be operable in any suitable manner, whereby they will be actuated upon the approach and during passage of the car thereover, in order to preclude a continual jetting of air from the stationary piers 12. Furthermore, it is desirable that the elevation of the adjacent cradle members 32 of the independent support piers 12 be substantially equal throughout the path or course which the car 10 is to travel. Each vertical variance in height of the piers 12 due to grade changes of the terrain should preferably be slight in order that the resulting vertical curves in the path of travel for the car 10 will be substantially flat. It is also preferable that the arrangement or disposition of the support piers 12 be such that any horizontal curves will also be gentle or substantially flat to facilitate movement of the car therealong. Turntables, or the like (not shown), should preferably be installed at any sharp turns, or at any line intersections, wherein the same car is to be used on both lines. For convenience, passenger stations could be located at these points, such as on parking lots or bus stations, and preferably spaced one to three miles apart.

As hereinbefore set forth, the frames or cradles 32 may be constructed in any suitable manner and are preferably anchored to the foundations 12, on bridges or in tunnels, or the like. As a practical matter, the support wheels 26 and 28 may be spaced approximately eight feet apart, but not limited thereto, and the shaft 30 is disposed substantially perpendicular to the line or direction of travel of the car 10. The space between the independent support foundations 12 may be desired to preclude interference with presently existing facilities. For example, the piers may be spaced to clear streets and obstacles. In this instance, the piers may be spaced on approximately sixty foot centers and by use of a pier in the median of a super highway, major traffic ways may be crossed with this type spacing whereby interference with surface pedestrian traffic or vehicular traffic will be unimpeded. If it is desired to install the piers on railroad tracks that are still in use, it will be apparent that the cradles and support piers must conform to a suitable configuration to provide clearance for any trains which may be moving on the tracks. Bridging structures or girding is substantially eliminated and is necessary only between any pier 12 wherein it is necessary to provide an unduly long span therebetween.

*Operation*

Whenever or wherever it is desired to provide an economical transit system, the piers 12 may be installed with spacing therebetween as determined by the conditions established by the existing facilities in the area to be served. The span car 10, being of a minimum length of at least two and one-half times the distance between two adjacent support pier structures 12, will be supported by at least two of the support structures at all times during movement of the car along the travel path as established by the plurality of piers. The car 10 is powered in any suitable manner, such as jet motors, for propulsion along the plurality of independent support piers 12 and cradles 32. Of course, additional power means may be provided for facilitating acceleration and deceleration of the car 10, if desired. The rails 20 and 22 move smoothly and easily along the spaced wheels 26 and 28 provided in the cradle 32 of each pier 12 and the guide channel 34 will be directed between the guide wheels 36 and 38 of each cradle 32. In this manner, the car 10 may move easily and smoothly throughout substantially any distance and along the support frames 12 to provide a rapid transit system with a minimum of bridging structures or unsightly girders and tracks.

As hereinbefore set forth, the forward end 14 of the car 10 is cambered, whereby there will be no interference between the forward end of the car and any pier 12 which the car may be approaching in the event of any relative vertical variencies therebetween. In addition, the forward portion of the guide channel 34 is tapered for facilitating movement between the guide wheels 36 and 38 as the car approaches a pier 12, thus facilitating the initial engagement between the guide channel and guide wheels. It will be apparent that the guide channel 34 will be disposed between at least two pairs of guide wheels 36 and 38 at all times during travel of the car, thus assuring an efficient guiding of the car 10 during travel throughout the system. The guide channel 34 may ride against either of the guide wheels 36 and 38 as the car 10 moves throughout the system and the wheels 36 and 38, being freely rotatable, will be rotated upon such contact for facilitating movement of the car and in no manner interfering therewith. The wheels 26 and 28 are freely journalled in the cradle 32 of each pier 12 and will rotate upon contact by the respective runners 20 and 22 for assuring a smooth and even movement of the car 10.

From the foregoing, it will be apparent that the present invention provides a novel rapid transit system particularly designed and constructed for traversing congested areas or open countryside in a manner for eliminating interference with existing facilities or the normal flow of surface travel. Independent piers are provided for supporting a span car which moves along from pier to pier in a smooth and rapid manner with a minimum use of girder supports, bridging tracks, or the like. Of course, the particular embodiment depicted herein, relates to an elevated structure, but it is to be understood that the same type of car and support devices may be utilized directly on the surface of the ground or in underground tunnels, or the like. The novel span car and support structures, therefor, are simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. In a transportation system, an elongated independently powered vehicle, a plurality of independent support piers longitudinally spaced throughout the desired path of travel for the system substantially flat elongated support cradle means secured to the upper portion of each support pier, runner members provided on the bottom of said vehicle, means carried by the support cradle for cooperation with the rail members whereby the vehicle may move along a plurality of the support piers, and said vehicle being of a length determined by the spacing of the piers assuring support thereof by at least two of the piers at all times.

2. In a transportation system as set forth in claim 1, wherein guide means cooperates between the vehicle and the support cradle for facilitating movement of the vehicle along the support piers.

3. A transit system comprising an elongated independently movable vehicle, a plurality of individual pier members longitudinally spaced along the transit system to determine a path of travel for the vehicle transversely extending cradle means provided on the upper portion of each pier for supporting the vehicle, said vehicle being of a length sufficient to assure that the vehicle will be supported by at least two of said cradle means at all times, a plurality of spaced support wheels journalled in each cradle means, spaced substantially flat elongated runner members provided on the vehicle for engaging the wheels to assure a smooth movement for the vehicle during travel, and guide means cooperating between the vehicle and the cradle means for maintaining the vehicle in proper alignment with the cradle means and piers during travel.

4. In a transit system as set forth in claim 3, wherein the guide means comprises a guide channel carried by the vehicle and cooperating with spaced guide rollers provided on each cradle means.

5. In a transportation system, a plurality of independent support members longitudinally spaced along the desired path of travel for the system, an elongated independently movable vehicle of sufficient length to assure support thereof by at least two support members at all times, means cooperating between the plurality of support members and the vehicle whereby the vehicle may be smoothly propelled along the path of travel established by the piers, and guide means cooperating between the support members and the vehicle for maintaining the vehicle in substantial alignment during the movement thereof, said guide means comprising a centrally disposed channel member secured to the under surface of the vehicle and extending substantially throughout the length thereof, and a pair of spaced roller members carried by each support member for engaging the opposed edges of the channel for guiding of the vehicle during the movement thereof.

6. A transit system comprising an elongated independently movable vehicle, a plurality of individual pier members longitudinally spaced along the transit system to determine a path of travel for the vehicle, transversely extending cradle means provided on the upper portion of each pier for supporting the vehicle, said vehicle being of a length sufficient to assure that the vehicle will be supported by at least two of said cradle means at all times, a plurality of spaced support wheels journalled in each cradle means, spaced substantially flat elongated runner members provided on the vehicle for engaging the wheels to assure a smooth movement for the vehicle during travel, and guide means cooperating between the vehicle and the cradle means for maintaining the vehicle in proper alignment with the cradle means and piers during travel, said guide means comprising a centrally disposed elongated channel member secured to the under surface of the vehicle and extending substantially throughout the length thereof, a pair of spaced roller members journalled on the cradle means and having the planes thereof at substantially right angles to the planes of the wheels for engaging the opposite sides of the channel member for guiding the vehicle throughout the path of travel along the spaced piers.

References Cited by the Examiner

UNITED STATES PATENTS

| | | | |
|---|---|---|---|
| 283,947 | 8/83 | Augspath | 104—135 |
| 895,256 | 8/08 | Goudron | 104—135 |
| 1,497,754 | 6/24 | Howard | 104—135 |
| 1,616,761 | 2/27 | Rose | 104—135 |
| 2,652,785 | 9/53 | Cox | 105—29 |
| 2,751,853 | 6/56 | Templeton | 104—135 |
| 2,969,751 | 1/61 | Toulmin | 104—23 |

LEO QUACKENBUSH, *Primary Examiner.*